US008248812B2

(12) United States Patent
Xiong

(10) Patent No.: US 8,248,812 B2
(45) Date of Patent: Aug. 21, 2012

(54) COVER LATCHING ASSEMBLY FOR ELECTRONIC DEVICE

(75) Inventor: Bin Xiong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 344 days.

(21) Appl. No.: 12/627,051

(22) Filed: Nov. 30, 2009

(65) Prior Publication Data

US 2010/0328858 A1  Dec. 30, 2010

(30) Foreign Application Priority Data

Jun. 26, 2009 (CN) .......................... 2009 1 0303760

(51) Int. Cl.
*H05K 5/00* (2006.01)
(52) U.S. Cl. ........ 361/759; 361/801; 361/802; 361/803; 361/726; 361/732; 361/747; 455/550.1; 455/575.8; 455/90.3; 429/96; 429/97; 429/100
(58) Field of Classification Search .......... 361/801–803, 361/726, 732, 747, 759, 679; 455/550.1, 455/575.8, 90.3; 429/96, 97, 100
See application file for complete search history.

(56) References Cited

U.S. PATENT DOCUMENTS

| 6,490,436 B1* | 12/2002 | Kaiwa et al. ................. 455/90.1 |
| 6,660,427 B1* | 12/2003 | Hukill et al. .................... 429/97 |
| 7,065,389 B2* | 6/2006 | Kim et al. ...................... 455/572 |
| 7,274,554 B2* | 9/2007 | Kang et al. ............... 361/679.01 |
| 2006/0166083 A1* | 7/2006 | Zhang et al. .................... 429/97 |
| 2006/0175840 A1* | 8/2006 | Wang et al. ................... 292/228 |
| 2007/0010219 A1* | 1/2007 | Qin et al. ...................... 455/128 |
| 2007/0122693 A1* | 5/2007 | Qin et al. ........................ 429/97 |
| 2008/0042448 A1* | 2/2008 | Ge et al. ........................ 292/137 |
| 2008/0318646 A1* | 12/2008 | Lin ............................. 455/575.4 |
| 2009/0246610 A1* | 10/2009 | Shi et al. ....................... 429/100 |

* cited by examiner

*Primary Examiner* — Hung S Bui
*Assistant Examiner* — James Wu
(74) *Attorney, Agent, or Firm* — Altis Law Group, Inc.

(57) ABSTRACT

A cover latching assembly includes a housing, a releasing assembly and a cover. The housing includes an upper board, a side board extending from the upper board and an assembling portion disposed on the upper board communicating with the side board through a hole. The cover is detachably mounted on the housing and includes an upper wall and a peripheral wall. The peripheral wall has a notch defined therethrough corresponding to the hole; the upper wall has a latching hook formed thereon adjacent to the notch. The releasing assembly is releasably assembled within the accommodating portion of the housing through the hole and partially accommodated within the hole for releasably latching with the latching hook of the cover.

11 Claims, 6 Drawing Sheets

COVER LATCHING ASSEMBLY FOR ELECTRONIC DEVICE

BACKGROUND

1. Technical Field

The exemplary disclosure generally relates to cover latching assemblies, and particularly, to a cover latching assembly used in an electronic device.

2. Description of Related Art

Batteries are widely used in electronic devices, such as personal digital assistants (PDAs), mobile phones, and so on. Conventional batteries are attachably received in the electronic device, and cover latching assemblies are designed to package the batteries within housings of the electronic devices, thus the batteries and the inner circuits of the electronic devices are protected.

A conventional cover latching assembly generally includes a cover and a housing. The cover tightly engages with the housing to be secured thereon. However, due to the tight engagement of the cover and the housing in many conventional designs, the user may need to apply a significant amount of force to assemble/disassemble the cover to/from the housing, which can result in the cover and the housing being damaged.

Therefore, there is room for improvement within the art.

BRIEF DESCRIPTION OF THE DRAWINGS

Many aspects of the cover latching assembly can be better understood with reference to the following drawings. These drawings are not necessarily drawn to scale, the emphasis instead being placed upon clearly illustrating the principles of the present cover latching assembly. Moreover, in the drawings like reference numerals designate corresponding sections throughout the several views.

DETAILED DESCRIPTION

Figure 1:
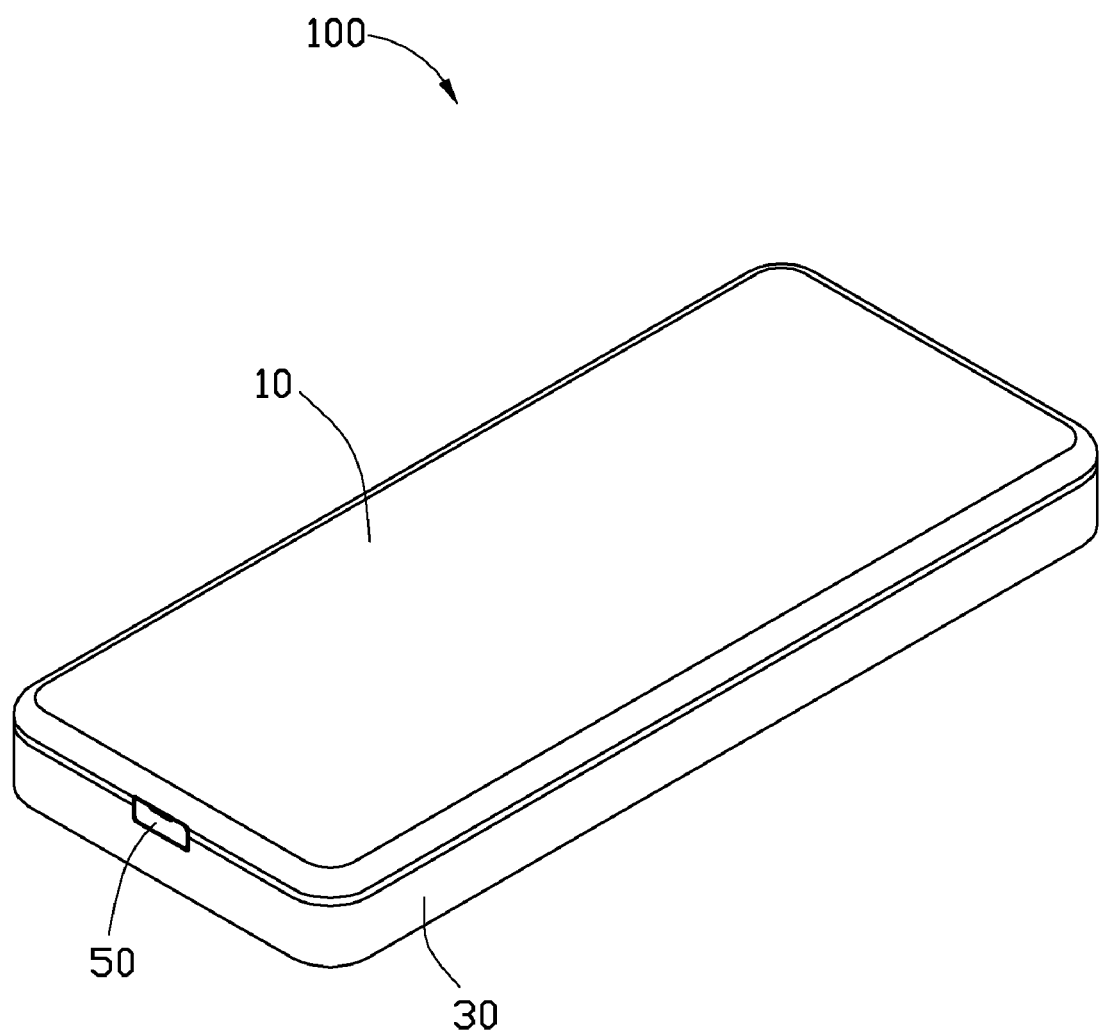
FIG. 1 shows a perspective view of the cover latching assembly, in accordance with an exemplary embodiment.

FIG. 1 shows an exemplary cover latching assembly 100 for electronic devices, such as mobile phones, digital cameras etc. The cover latching assembly 100 includes a cover 10, a housing 30, and a releasing assembly 50 configured for detachably mounting the cover 10 to the housing 30.

Figure 2:
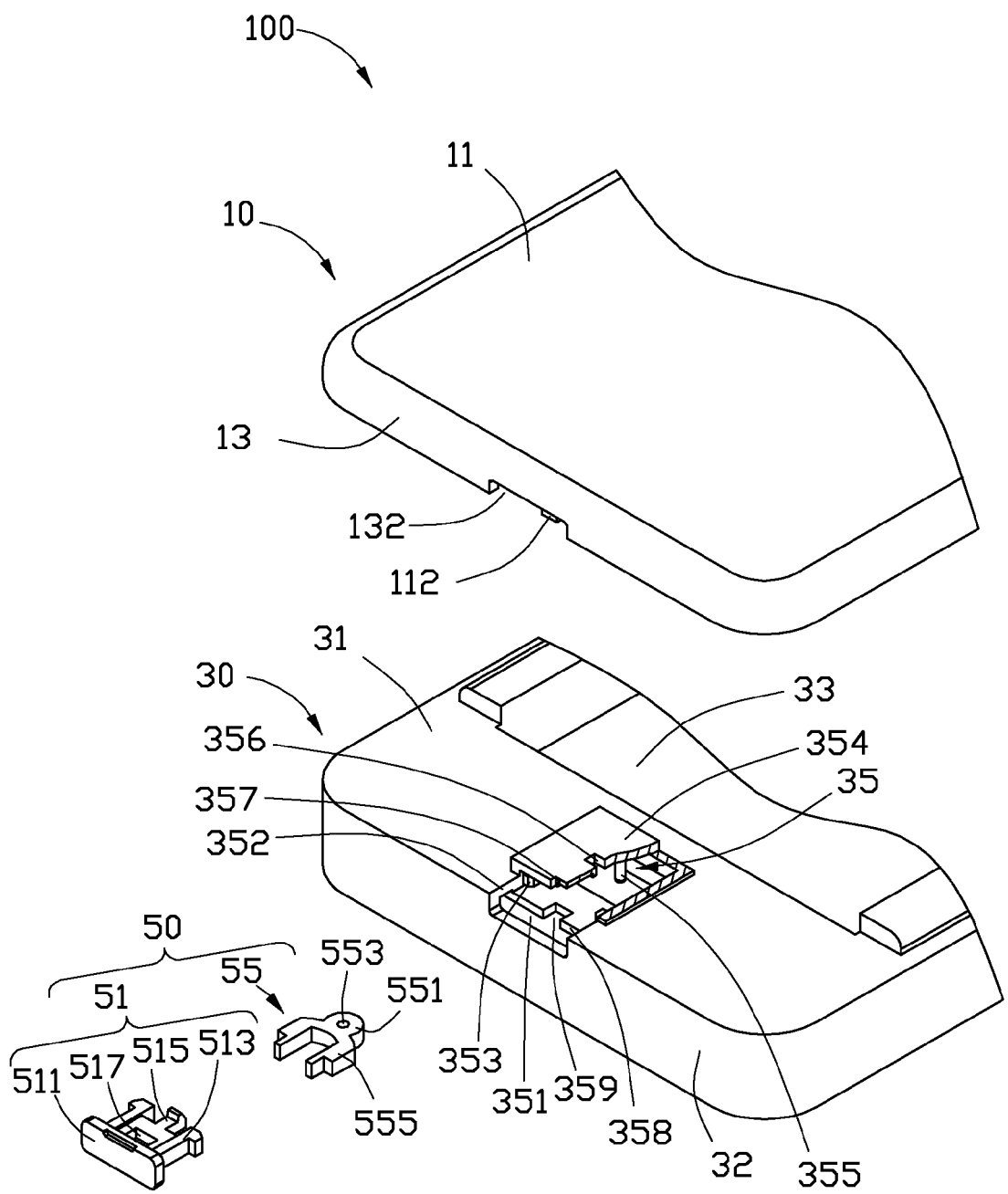
FIG. 2 shows an exploded, perspective view of the cover latching assembly shown in FIG. 1.
Figure 3:
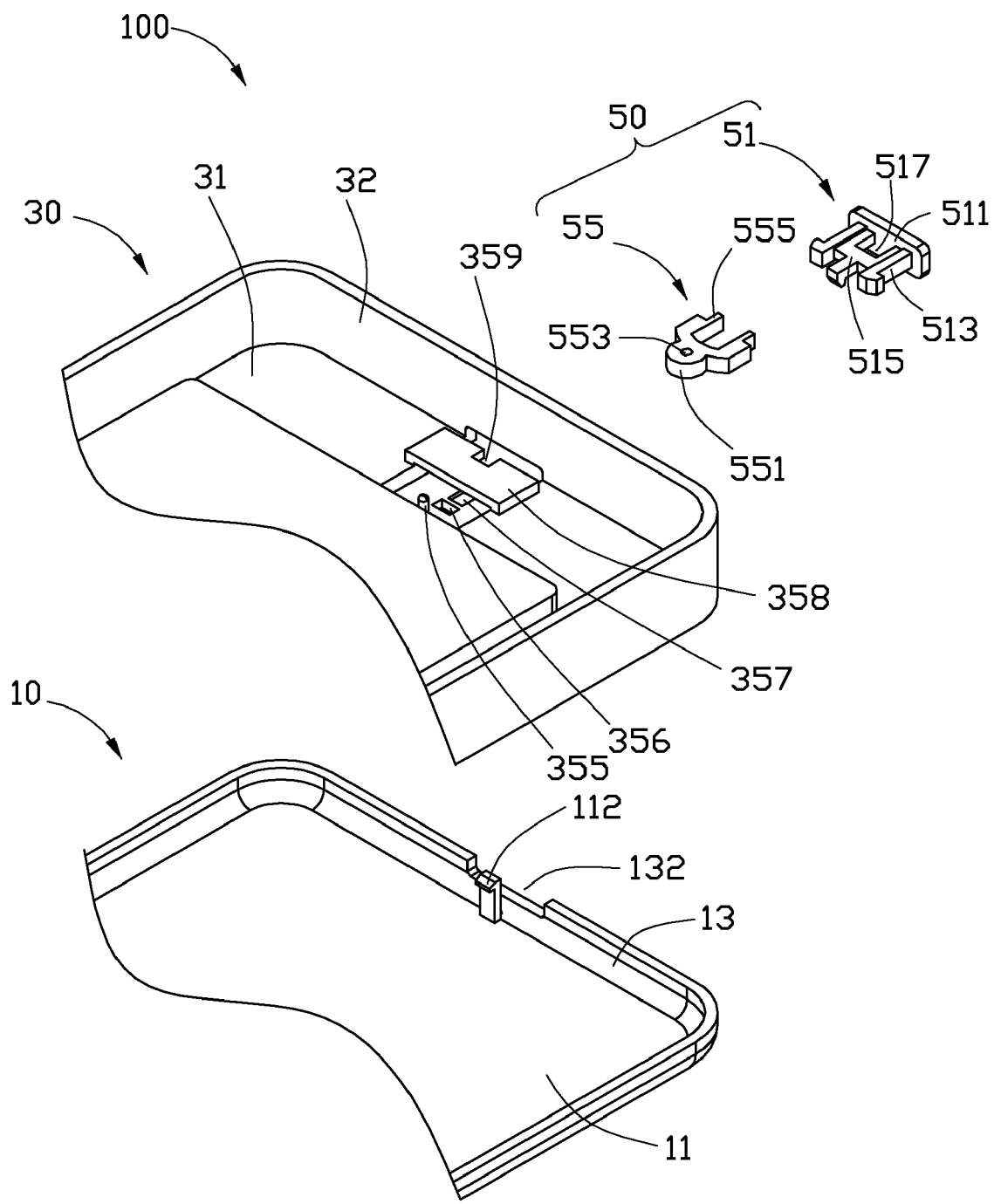
FIG. 3 is similar to FIG. 2, but viewed from another angle.

Referring to FIG. 2 and FIG. 3, the cover 10 is detachably mounted to the housing 30. The cover 10 includes an upper wall 11 and a peripheral wall 13. The peripheral wall 13 has a notch 132 defined therethrough. The upper wall 11 includes a latching hook 112 formed on an inner surface thereof adjacent to the notch 132.

The housing 30 may be a part or main body of an electronic device. The housing 30 includes an upper board 31, a side board 32 perpendicularly extending from one end of the upper board 31, a battery receiving compartment 33, and an assembling portion 35. The central part of the upper board 31 is recessed to form the battery receiving compartment 33 for receiving a battery (not shown) therein. The assembling portion 35 is a hollow chamber disposed between the side board 32 and the battery receiving compartment 33 for assembling the releasing assembly 50 therein, and position corresponding in position to the latching hook 112 and the notch 132 of the cover 10. A hole 351 is defined through the junction of the side board 32 and the upper board 31 toward the battery receiving compartment 33 to communicate with the assembling portion 35, two sides of the hole 351 form two guiding sidewalls 352. Each guiding sidewall 352 forms a stop block 353 thereon adjacent to the side board 32. A cover plate 354 and a base plate 358 are formed on a corresponding outer surface and an inner surface of the upper board 31 respectively, adjacent to the side board 32. The cover plate 354 spans across one side of the hole 351 and the base plate 358 spans across the other side of the hole 351. The cover plate 354 includes a fixing post 355 protruding from an inner surface thereof. A latching hole 356 is defined through the middle portion of the cover plate 354 adjacent to the fixing post 355 and is positioned between the side board 32 and fixing post 355. A restricting gap 357 is defined through an end portion of the cover plate 354 toward the side board 32 corresponding to the latching hook 112 of the cover 10. The base plate 358 defines a gap portion 359 through the end portion thereof facing the side board 32.

The releasing assembly 50 is assembled in the assembling portion 35 of the housing 30 for locking or detaching the cover 10 to or from the housing 30. The releasing assembly 50 includes a releasing piece 51 and an elastic piece 55. The releasing piece 51 is slidably assembled within the assembling portion 35 and includes a pressing portion 511, two pushing portions 513 and a lock portion 515. The two pushing portions 513 are each substantially L-shaped hooks formed at opposite sides of the pressing portion 511. The lock portion 515 is a substantially L-shaped hook protruding from the middle portion of the pressing portion 511 and is sandwiched between the two pushing portions 513. The lock portion 515 is configured for being releasably latched into the corresponding latching hole 356 of the cover plate 354. The lock portion 515 has an assembling hole 517 defined therethrough near the pressing portion 511 corresponding to the latching hook 112 of the cover 10. The elastic piece 55 is substantially U-shaped and is made of elastic material such as rubber. The elastic piece 55 includes a fixing portion 551 and elastic arms 555 formed at two ends of the fixing portion 551. The fixing portion 551 has a fixing hole 553 defined therethrough corresponding to the fixing post 355 of cover plate 354.

Figure 4:
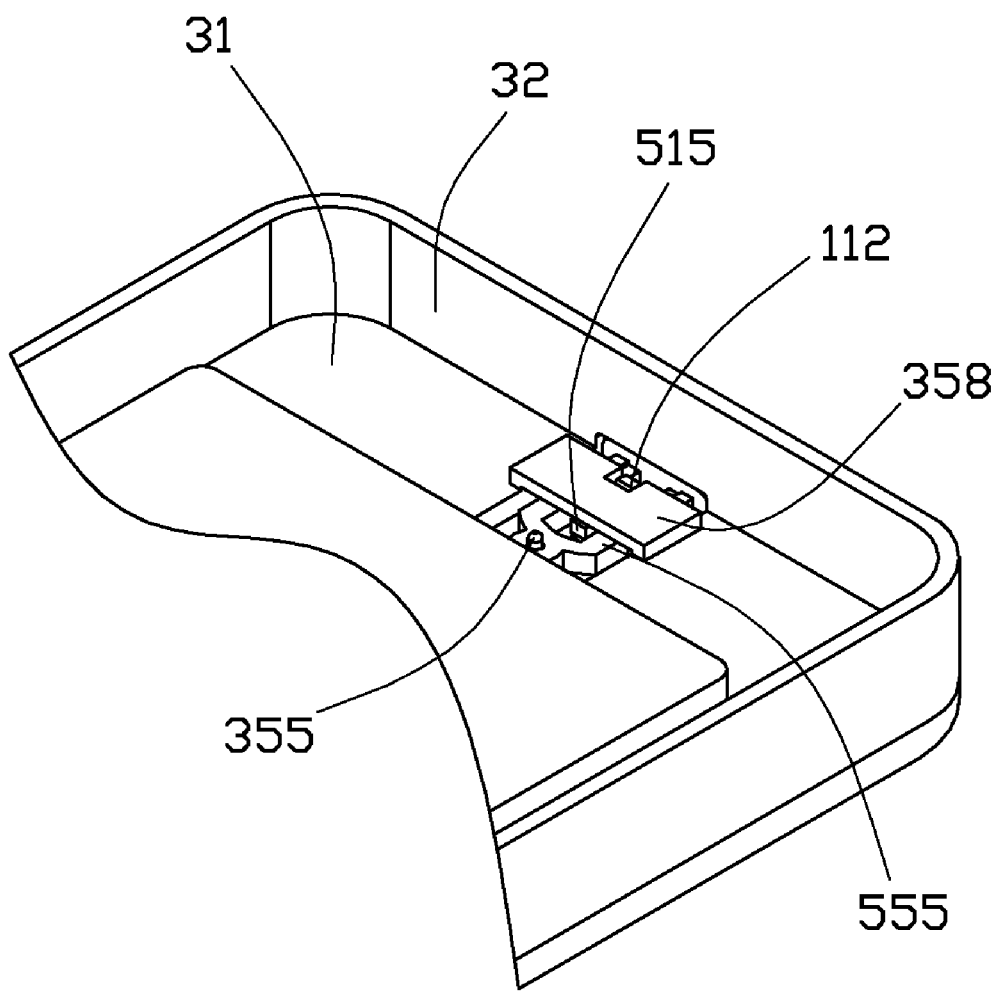
FIG. 4 is similar to FIG. 1, but viewed from another angle.
Figure 5:
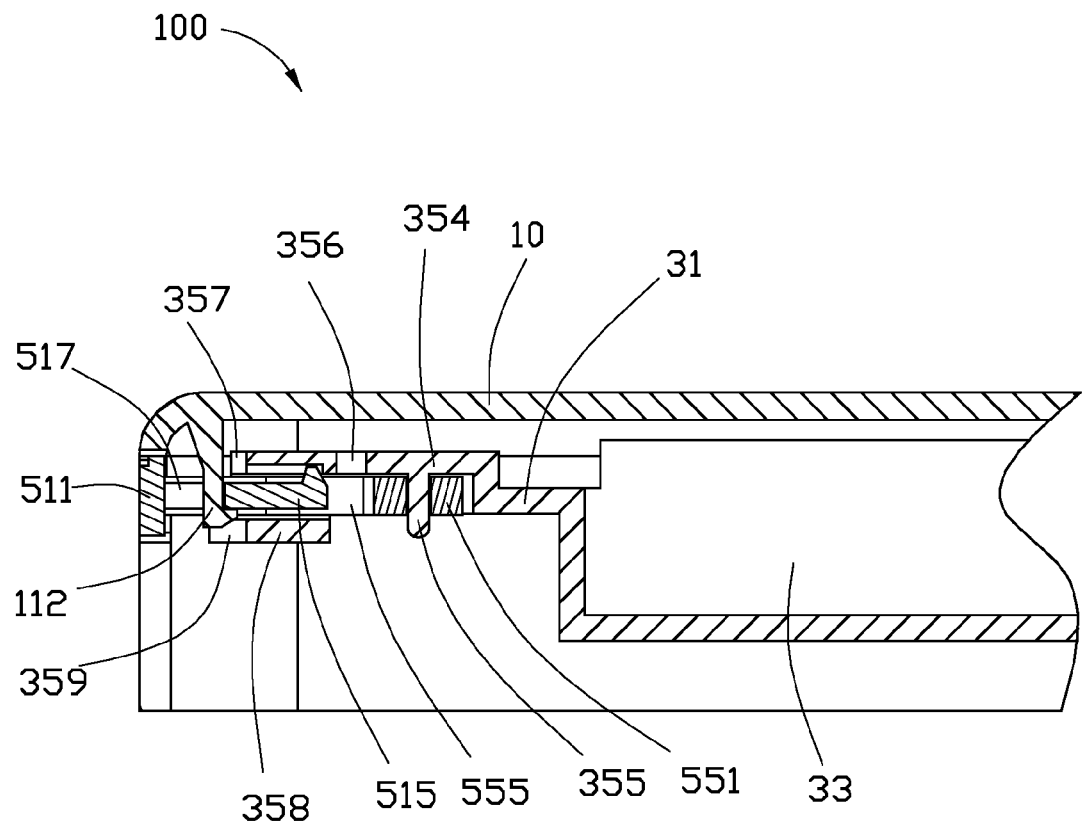
FIG. 5 shows an assembled, partially cut-away view of the cover latching assembly shown in FIG. 2, wherein the cover latching assembly is in a closed mode.

Also referring to the FIG. 4 and FIG. 5, in assembly, the elastic piece 55 is inserted into the assembling portion 35 through the hole 351 and fixed to the fixing post 355 of the cover plate 354. Correspondingly, the fixing post 355 penetrates through the fixing hole 553 of the fixing portion 551 of the elastic piece 55. The two elastic arms 555 resist on the two guiding sidewalls 352 respectively. The releasing piece 51 is slidably assembled to the assembling portion 35. The two pushing portions 513 are slidably inserted into the hole 351 along the two guiding sidewalls 352 by sliding across the corresponding two stop blocks 353 respectively and resist on the two elastic arms 555 of the elastic piece 55. The cover 10 is mounted on the housing 30 to cover the battery receiving compartment 33. The latching hook 112 of cover 10 penetrates through the restrict gap 357 and the assembling hole 517 of the releasing assembly 50 and latches to the lock portion 515 of the releasing piece 51. The pressing portion 511 is accommodated or surrounded by the notch 132 of the cover 10 and the hole 351. Thus, the cover 10 is assembled to the housing 30, as represented in FIG. 5.

Figure 6:
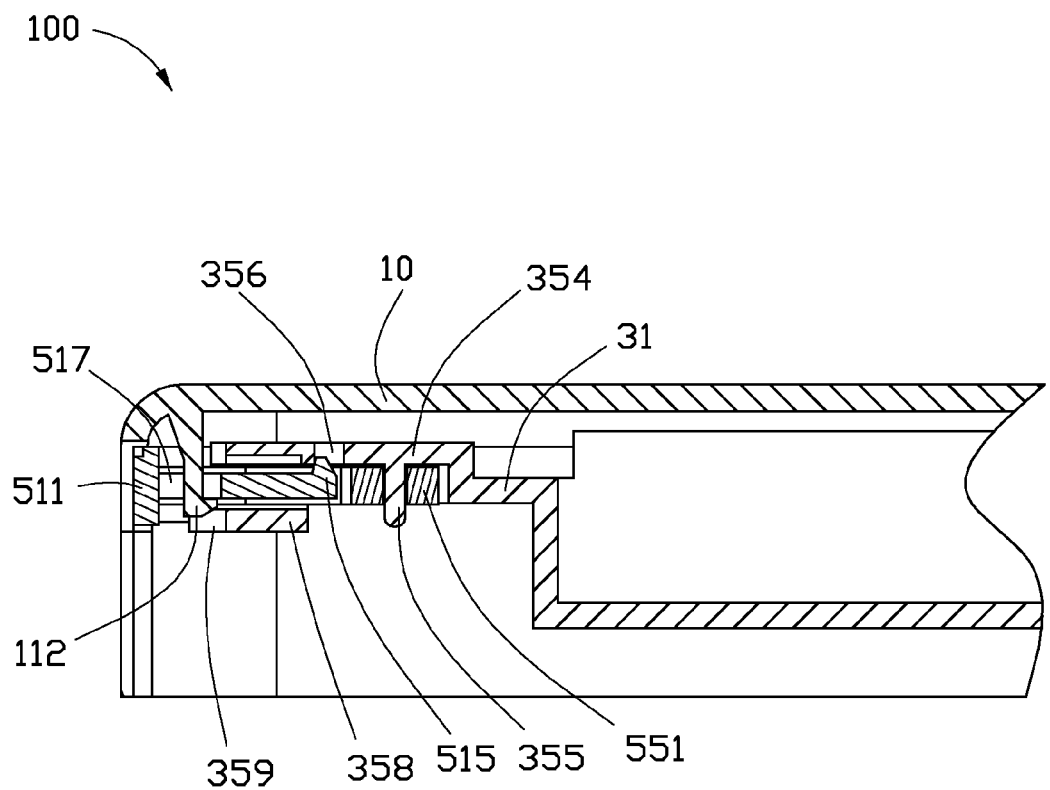
FIG. 6 shows an assembled, cut-away view of the cover latching assembly in an open mode.

Also referring to FIG. 6, to detach the cover 10 from the housing 30, the pressing portion 511 of the releasing piece 51 is pushed toward the battery receiving compartment 33, causing the two pushing portions 513 to slide along the guiding sidewalls 352 toward the battery receiving compartment 33 and compress the corresponding elastic arms 555 until the distal end of the lock portion 515 is latched into the latching hole 356 of the cover plate 354. Then, the distal end of the latching hook 112 is released to depart from the lock portion 515 and positioned within the assembling hole 517, thus, the cover 10 can be detached from the housing 30 directly along the direction perpendicular to the housing 30. After the cover is detached from the housing, the pressing portion 511 of the releasing piece 51 is pushed further toward the battery receiving compartment 33, to cause the distal end of the lock portion 515 escape from the latching hole 356 and return back to its original position by means of the elastic force of the elastic arms 555.

It is to be understood that the latching hole 356 of the cover plate 354 can be omitted, thus, when detaching the cover 10 from the housing 30, the releasing piece 51 is pushed toward the battery receiving compartment 33 until the latching hook 112 is released from the base plate 358, and then, holding the pressing portion 511 and detaching the cover 10 from the housing 30.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A cover latching assembly used in an electronic device, comprising:
   a housing having an upper board, a side board extending from the upper board and an assembling portion disposed on the upper board communicating with the side board through a hole;
   a cover detachably mounted on the housing, the cover comprising an upper wall and a peripheral wall; the peripheral wall having a notch defined therethrough corresponding to the hole; the upper wall having a latching hook formed thereon adjacent to the notch; and
   a releasing assembly assembled within the accommodating portion of the housing and partially accommodated within the hole, the releasing assembly comprising a releasing piece having a pressing portion, two pushing portions formed at opposite sides of the pressing portion, and a lock portion protruding from the pressing portion and being sandwiched between the pushing portions, the lock portion comprising an assembling hole defined therethrough configured for releasably latching with the latching hook.

2. The cover latching assembly as claimed in claim 1, wherein the hole is defined through the junction of the side board and the upper board communicating with the assembling portion, thereby forming a guiding sidewall at each side thereof.

3. The cover latching assembly as claimed in claim 2, wherein the releasing piece slidably assembled within the hole, the pushing portions slidable relative to the housing along corresponding guiding sidewalls.

4. The cover latching assembly as claimed in claim 3, wherein the releasing assembly further includes an elastic piece assembled within the assembling portion, the elastic piece includes a fixing portion and an elastic arm formed at opposite end of the fixing portion, the elastic arms elastically resist the corresponding pushing portions of the releasing piece.

5. The cover latching assembly as claimed in claim 4, wherein a cover plate and a base plate are formed on corresponding outer surface and inner surface of the upper board respectively and both spans across two sides of the hole opposite to each other; the hole, the cover plate and the base plate together form the assembling portion; the cover plate includes a fixing post protruding on inner surface thereof opposite to the side board; the fixing portion of the elastic piece defines a fixing hole therethrough for being fixed to the corresponding fixing post of cover plate.

6. The cover latching assembly as claimed in claim 5, wherein the cover plate includes a latching hole defined therethrough adjacent to the fixing post corresponding to the lock portion of the releasing piece, the lock portion is configured for being releasably latched into the corresponding latching hole of the cover plate.

7. The cover latching assembly as claimed in claim 2, wherein each guiding sidewall includes a stop block formed thereon adjacent to the side board.

8. A cover latching assembly, comprising:
   a housing having an upper board, a side board and an hollow assembling portion disposed on the upper board near the junction of the side board and the upper board;
   a hole defined through the junction of the housing for communicating with the assembling portion, and thereby forming a guiding sidewall at each side thereof;
   a cover detachably mounted on the housing comprising an upper wall; the upper wall having a latching hook formed thereon; and
   a releasing assembly releasably assembled within the housing through the hole and partially accommodated within the hole, the releasing assembly comprising a releasing piece having a pressing portion, two pushing portions formed at opposite sides of the pressing portion, and a lock portion protruding from the pressing portion and being sandwiched between the pushing portions, the lock portion comprising an assembling hole defined therethrough configured for releasably latching with the latching hook.

9. The cover latching assembly as claimed in claim 8, wherein the cover further includes a peripheral wall extending from the peripheral edge of the upper wall; the peripheral wall has a notch defined therethrough opposite to the latching hook corresponding to the hole.

10. The cover latching assembly as claimed in claim 8, wherein the releasing piece slidably assembled within the hole, the pushing portions slidable relative to the housing along corresponding guiding sidewalls; each guiding sidewall includes a stop block formed thereon adjacent to the side board to prevent the releasing piece departing from the housing.

11. The cover latching assembly as claimed in claim 10, wherein a cover plate and a base plate are formed on corresponding outer surface and inner surface of the upper board respectively and both spans across two sides of the hole opposite to each other; the hole, the cover plate and the base plate together form the assembling portion; the cover plate includes a fixing post protruding on inner surface thereof opposite to the side board; the fixing portion of the elastic piece defines a fixing hole therethrough for being fixed to the corresponding fixing post.

* * * * *